United States Patent Office 2,962,458
Patented Nov. 29, 1960

2,962,458

PLASTER COMPOSITION COMPRISING PLASTER OF PARIS AND POLYACRYLAMIDE

Henry William Bird, Deer's Leap, Warninglid, Sussex, and Roderick Louis Stephens, Brighton, England (325 Borough High St., London SE. 1, England)

No Drawing. Filed Dec. 27, 1957, Ser. No. 705,497

Claims priority, application Great Britain Jan. 11, 1957

3 Claims. (Cl. 260—8)

This invention relates to plaster compositions, and is concerned with such a composition incorporating plaster of Paris.

According to this invention there is provided a plaster composition comprising a major proportion as hereinafter defined of plaster of Paris and polyacrylamide as hereinafter defined in a proportion by weight of 0.2 to 2% based on the composition. The preferred composition contains substantially 0.75% by weight of polyacrylamide. By "major proportion of plaster of Paris" is meant that the composition contains at least 50% by weight of plaster of Paris.

By polyacrylamide is meant that polymer in which the recurring monomeric unit is:

$$H_2C—CH—CONH_2$$

The preferred polyacrylamide has a mean molecular weight of 75,000 and viscosity of 200 to 600 cp. in a 5% aqueous solution at 25° C. as measured with a Brookfield viscometer. Polyacrylamides having mean molecular weights from 50,000 to 100,000 may, however, also be used.

The composition desirably also contains between 1 and 5% of animal glue, up to 1% of a wetting agent, up to 10% of a chemically inert water-insoluble filler and not more than 4% of gypsum. It will be appreciated that any combination of these additives may be incorporated in the plaster composition depending on the nature of the final composition which it is desired to obtain. The inert filler is preferably used in a proportion of between 4 and 5% and may consist for instance of cellulosic fillers such as finely divided 200 mesh (BSS sieve) wood cellulose or powdered coco-nutshells, or of non-cellulosic fillers such as finely divided mica.

The plaster composition is desirably used as a powder passing an 80 mesh BSS sieve and may conveniently be formed by mixing constituents that are already finely divided. Usually, these constituents will be ground to a fineness of at least 100 mesh.

The presence of the polyacrylamide in the plaster of Paris composition is believed to give a high adhesion of the composition to the surface on which it is applied and to increase the range of mixtures of the powdered composition with water that give a workable paste-like condition. These proportions will generally vary from 2 parts of the dry plaster composition to 1 of water, to a proportion of 2.75 parts of the dry plaster composition to 1 of water. The addition of animal glue will slow the setting time of the composition, whilst on the other hand the gypsum will speed the rate of setting. The cellulosic type fillers are of value in creating voids within the setting plaster composition and finally the wetting agents improve the wetting of the plaster constituents and reduce the viscosity of the mixture, so giving a high proportion of solids to liquids in the final filling putty and a stronger composition when set.

The invention is illustrated by the following examples of plaster of Paris compositions in which all parts are by weight:

|  | Mesh Size (BSS sieve) | Examples | | | | | | | | | |
|---|---|---|---|---|---|---|---|---|---|---|---|
|  |  | 1 | 2 | 3 | 4 | 5 | 6 | 7 | 8 | 9 | 10 |
| Plaster of Paris (a mixture of 1st and 2d grades or entirely of one grade) | 100 | ⁴878 | 875 | 873 | 880 | 885 | 885 | 920 | 990 | 980 | 970 |
| Gypsum | 200 | 20 | 40 | 10 | 20 | 20 | 30 | 30 | | | |
| Polyacrylamide grade 75 ¹ | 120 | 7.5 | 20 | 2 | 10 | 10 | 10 | 10 | 10 | 20 | 10 |
| Wood cellulose ² | 200 | 45 | 5 | 100 | 45 | 40 | 35 | | | | 10 |
| Animal Glue Flour | 120 | 40 | 50 | 10 | 40 | 40 | 40 | 40 | | | 10 |
| Lissapol D Powder ³ | 100 | 9.5 | 10 | 5 | 5 | 5 | | | | | |

¹ Mean molecular weight of 75,000.
² Finely divided highly purified wood cellulose material having an 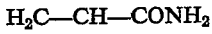-cellulose content of up to 93% (produced and sold under the name "Solka-floc" by the Brown Company, Berlin, New Hampshire, United States of America).
³ 28–32% by weight of the sodium salts of mixed sulphated fatty alcohols (sulphated cetyl-oleyl mixture). The sodium salts have an average molecular weight of 300.
⁴ Pure white plaster of Paris (99.7%) 1st grade—206 parts; fine white plaster of Paris (90%) 2d grade—672 parts.

In the above example, the Lissapol D powder may be replaced by any of the following detergents in the same proportion and of the same mesh size:

Sodium lauryl sulphate,
Salts of the sulphates of other primary fatty alcohols from $C_{10}$–$C_{24}$ and mixtures of these alcohols.
Salts of the sulphates of mixtures of secondary fatty alcohols from $C_{10}$–$C_{24}$.
Dioctyl sodium sulpho succinate.
Sorbitan mono-oleate, or
Polyoxyethylene (400) mono laurate.

Similarly, the wood cellulose filler may be replaced by finely divided mica, or short fibre asbestos in the same proportion and of the same mesh size.

The mixing is carried out in the usual type of drum or paddle mixer. If the wetting agent is in the form of a solution it is first mixed with the filler and dried before being incorporated.

We claim:

1. A plaster composition consisting of at least 50% by weight of plaster of Paris, from 0.2 to 2% by weight of polyacrylamide, from 1 to 5% by weight of animal glue, up to 1% by weight of an alkali salt of at least one sulphated fatty alcohol as a wetting agent, up to 10% by weight of a chemically inert water-insoluble filler selected from the group consisting of wood cellulose, finely divided mica and short fibre asbestos, and up to 4% by weight of gypsum, all percentages being based on the weight of the composition.

2. A plaster composition consisting of 87.8% by weight of plaster of Paris, 0.75% by weight of polyacrylamide, 4% by weight of animal glue, 0.95% by weight of the sodium salt of a sulphated cetyl-oleyl alcohol mixture, 4.5% by weight of finely divided wood cellulose, and 2% by weight of gypsum.

3. A filling putty consisting of at least 50% by weight of plaster of Paris, from 0.2 to 2% by weight of polyacrylamide, from 1 to 5% by weight of animal glue, up to 1% by weight of an alkali salt of at least one sulphated fatty alcohol as a wetting agent, up to 10% by weight of a chemically inert water-insoluble filler selected from the group consisting of wood cellulose, finely divided mica and short fibre asbestos, up to 4% by weight of gypsum, and water in a proportion such that the ratio between the weight of the dry composition and the weight of the water varies from 2:1 to 2.75:1, all percentages being based on the weight of the dry composition.

References Cited in the file of this patent
UNITED STATES PATENTS

| | | |
|---|---|---|
| 2,320,010 | Ralston et al. | May 25, 1943 |
| 2,745,813 | Logemann et al. | May 15, 1956 |
| 2,761,511 | Billue | Sept. 4, 1956 |